United States Patent [19]

Lovekamp

[11] Patent Number: 5,312,210
[45] Date of Patent: May 17, 1994

[54] APPARATUS FOR MACHINING TEETH

[75] Inventor: Terri L. Lovekamp, Cerro Gordo, Ill.

[73] Assignee: Caterpillar Inc., Peoria, Ill.

[21] Appl. No.: 939,778

[22] Filed: Sep. 3, 1992

[51] Int. Cl.$^5$ ............................................. B23F 5/22
[52] U.S. Cl. .................................. 409/11; 408/20; 409/18
[58] Field of Search ................ 408/20, 22, 23, 26; 409/11, 12, 18, 144, 230

[56] References Cited

U.S. PATENT DOCUMENTS

| | | | |
|---|---|---|---|
| 2,360,800 | 10/1944 | Staples | 409/18 |
| 3,232,170 | 2/1966 | Findley | 409/18 |
| 3,237,287 | 3/1966 | Kloski | 409/18 |
| 5,205,806 | 4/1993 | Ishida et al. | 409/11 |

FOREIGN PATENT DOCUMENTS

| | | | |
|---|---|---|---|
| 977207 | 5/1965 | Fed. Rep. of Germany | 409/11 |
| 2740517 | 3/1979 | Fed. Rep. of Germany | 409/11 |
| 540064 | 10/1941 | United Kingdom | 409/18 |
| 784040 | 10/1957 | United Kingdom | 409/11 |

*Primary Examiner*—Daniel W. Howell
*Attorney, Agent, or Firm*—Frank L. Hart; Robert E. Muir

[57] ABSTRACT

A multi-tool apparatus is useable for hobbing cylindrical blanks using a tool that has an axis of rotation that extends parallel to a line perpendicular to an axis extending through the center of the blank. The tool and the blank are both rotated during the cutting operation. The tool is spaced from the axis of rotation of the blank and linear movement of the tool is only in a direction parallel to the axis of the blank.

3 Claims, 2 Drawing Sheets

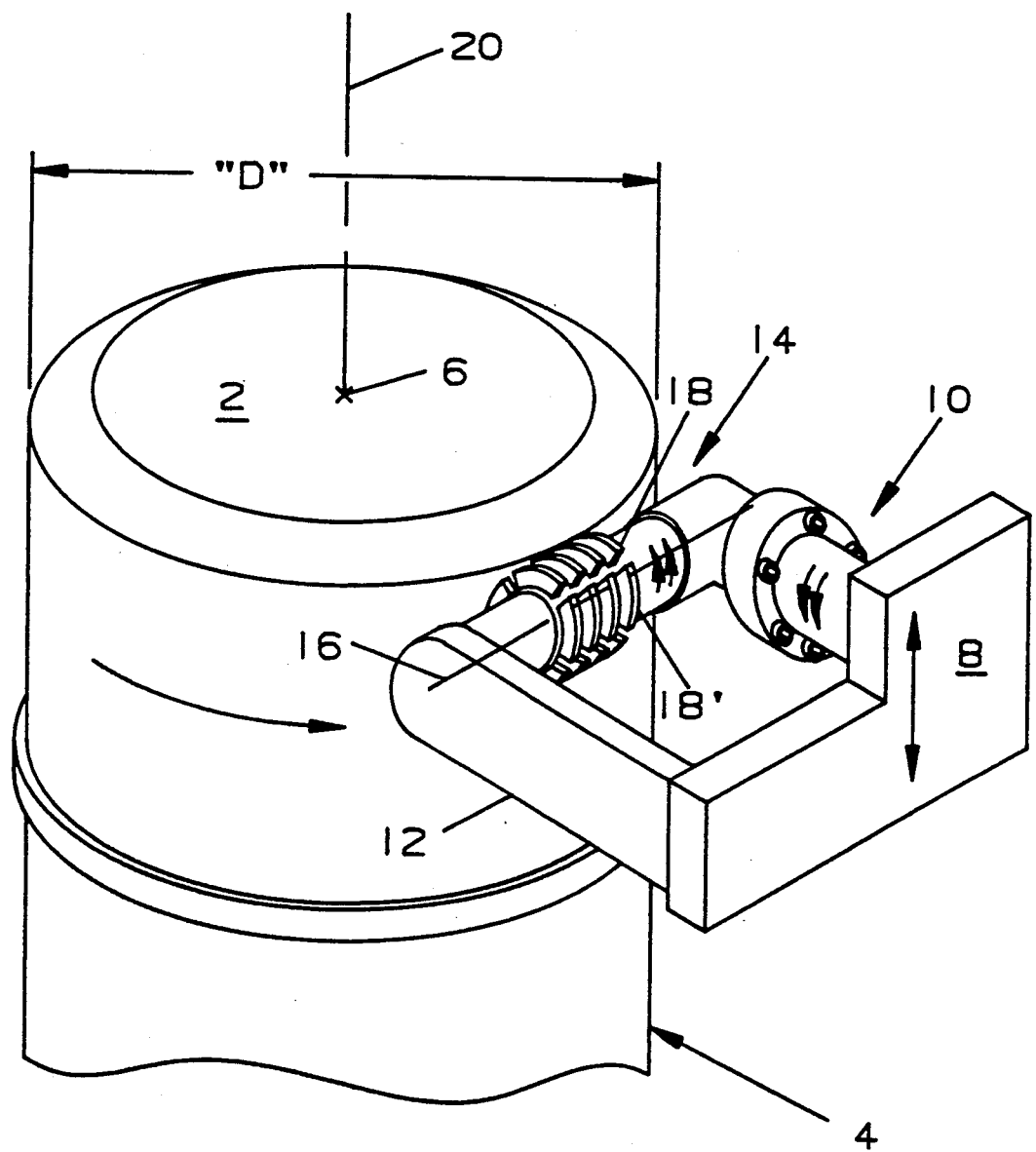

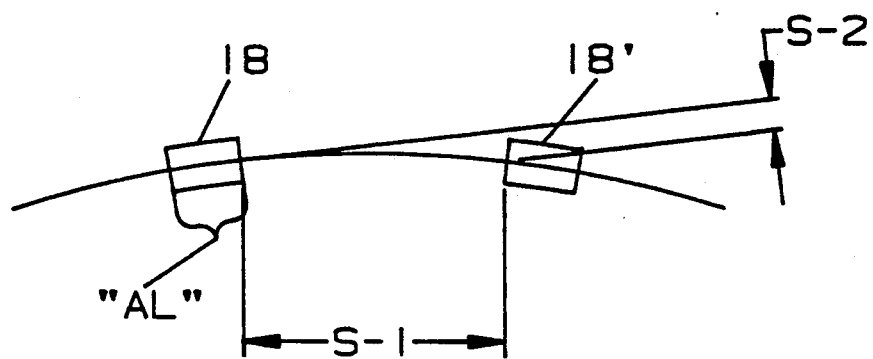
Fig_2_

APPARATUS FOR MACHINING TEETH

DESCRIPTION

1. Technical Field

This invention relates generally to apparatus and method for machining cylindrical blanks. More particularly, this invention relates to machining teeth in a blank where the machined teeth extend substantially parallel to an axis of rotation of the blank.

2. Background Art

In the machining of teeth on a cylindrical blank, it has heretofore been necessary to provide different hobbing machines for different sized blanks. Consequently, the machining operations involved moving the blank to different work centers, setting up various machines and in general consuming large volumes of wasted time, labor, and equipment.

It has been discovered that manufacturing operations can be greatly facilitated and large amounts of wasted effort and time can be eliminated if machining centers are used and efforts are made to reduce moving of the piece parts from the machining center.

This invention therefore resides in apparatus and method which incorporate the beneficial functions of a machining center assisted operation. The present invention is therefore directed to overcoming one or more of the problems of heretofore utilized equipment and methods.

DISCLOSURE OF THE INVENTION

In one aspect of the present invention, apparatus is provided for generating a blank and defining teeth extending substantially parallel to an axis passing through the center of the blank. A first means is provided for holding the blank and rotating the blank about its center at a preselected speed. A second means is provided for holding and bringing a multiplicity of different metal working tools into contact with the blank and moving said tools in a multiplicity of directions and at a multiplicity of speeds relative to said blank. A generating tool has an axis and a plurality of curved, interrupted, spaced apart grinding teeth. The generating tool is connectable to and rotatable about the tool axis by the second means. The generating tool is linearly moveable only in a direction parallel to said blank axis during cutting operations.

BRIEF DESCRIPTION OF THE DRAWINGS

FIG. 1 is a diagrammatic view of one apparatus embodying this invention; and

FIG. 2 is a partial view of the teeth of a generating tool useable with this invention.

BEST MODE FOR CARRYING OUT THE INVENTION

Referring to FIG. 1, a cylindrical blank 2 is positioned on and connected to a rotatable apparatus or first means 4 for rotating the blank 2 about a longitudinal axis 20 passing through its center 6 during tooth generating operations. Such holding-rotating apparatus are well known in the art and can be controlled to operate at various preselected speeds.

A second means 8, such as a programmable machine center for example, is provided for bringing a multiplicity of different metal working tools into contact with the blank 2 and moving the tools in a multiplicity of directions and at a multiplicity of speeds relative to said blank 2. Such second means 8 are well known in the art and in the recent past have become most useful in designing celled work stations so that numerous manufacturing operations can be performed at a single, rather limited spaced, working area.

A right angle driving head 10 is connected to the second means 8 and is associated with a supporting element 12 which is spaced from the driving head 10. A generating tool 14 is connectable to the drilling head 10 on one end and supported on the other end by the supporting element 12. The driving head 10 functions to rotate the generating tool 14 which is used to cut grooves in the blank and form intervening teeth. As is known in the art, the driving head 10 of the machine center 8 is preferably constructed to drive the generating tool 14 at a preselected, programmable rotational speed.

The generating tool 14 of this invention has an axis 16 and a plurality of curved, interrupted, spaced apart cutting teeth, referred to generally by 18 and 18'. The generating tool 14 is linearly moveable only in a direction parallel to the axis 20 of the blank 2 during cutting (i.e. axis 16 and tool 14 are the same distance from axis 20 during cutting) and is of a construction sufficient for forming teeth 18 which extend substantially parallel to the blank axis 20. As shown in the drawings, the blank axis 20 passes through the center 6 of the blank 2.

During cutting operations, the axis 16 of the generating tool 14 is maintained substantially parallel to a line (not shown) which is perpendicular to the axis 20 of the blank 2, and both the generating tool 14 and the blank 2 are rotated at preselected speeds.

Referring to FIG. 2, teeth 18, 18' will be described with reference only to a single tooth 18 for purposes of simplicity. Each generating tooth 18 has an arcuate length (AL), a lead (L) and is separated from an associated tooth (18') by an interrupting space (S). The dimensions and magnitudes of the length AL, lead L and space S are relative to each other and constructed for operating at a preselected generating tool 14 rotational speed. Likewise, the rotational speeds of the blank 2 and the generating tool 14 are responsive one to the other and selected in response to the diameter D of the blank.

Cutting teeth 18 of hobbing apparatus are well known in the art and there is a relatively large volume of information available upon which to guide a designer with regard to cutting speeds for the various types of metal to be cut and speeds of cutting. Once the designer has determined these variables and the diameter D of the blank 2, one can easily determine the optimum speed of rotation of the blank 2 during cutting operations. It then takes engineering work of little effort and without inventive effort to select the optimum variables of tooth design to construct the above-described generating tool 14 to cut the blank 2, as set forth above.

For convenience, one example generating system will be described in detail which is exemplary of the construction of this invention:

| Blank diameter (D) | 9.068 inches |
| --- | --- |
| Rotational speed of first means (4) | 4 rpm |
| Max diameter of generating tool (14) | 4 inches |
| Rotational speed of blank (2) | 200 rpm |
| Tooth arcuate length (AL) | 30 degrees |
| Tooth lead (L) | 3.5 degrees |
| Space between teeth | |
| S-1 (18-18') | 30 degrees |

| -continued | |
|---|---|
| S-2 (offset) | .3142 inches |

By so constructing the apparatus according to this invention, the rotating generating tool 14 is more easily maintained against lateral forces since the only relative linear movement of the tool 14 is substantially parallel to the axis 10 of the blank 2. Obviously, the forces exerted parallel to the axis 20 are controlled relative to the cutting rate and are not great.

Therefore, the savings of time and labor associated with tooling changes and setup time are greatly reduced by utilizing a common machine center 4 which can be of relative small mass because of the reductions of forces subjected thereon.

INDUSTRIAL APPLICABILITY

In the operation of the apparatus, the cylindrical blank 2 is preferably positioned with axis 20 extending in a vertical direction. The generating tool 18 is preferably positioned with its axis 16 of crosswise of axis 20, i.e. parallel to a line (not shown) rotation being perpendicular to axis 20. The teeth 18 of the generating tool are rotated in contact with the rotating blank 2 and the orientation of axis 16 and 20 are maintained during cutting operations. The generating tool 14 is linearly moved only in a direction parallel to the axis 20 of the blank 2 during cutting operations.

By constructing the apparatus according to this invention for use with a machine center, other manufacturing processes can be performed at the same location and thereby avoid the waste of time, labor, and equipment over heretofore utilized machining operations.

Other aspects, objects and advantages of this invention can be obtained from a study of the drawings, the disclosure and the appended claims.

I claim:

1. Apparatus for hobbing a cylindrical blank and defining spaced apart teeth extending substantially parallel to an axis passing through the center of the blank, comprising:

first means for holding the cylindrical blank and rotating said blank about its center at a preselected speed during cutting operations;

second means for holding and bringing a multiplicity of different metal working tools into contact with said blank and moving said tools in a multiplicity of directions and at a multiplicity of speeds relative to said blank;

a generating tool having an axis and a plurality of curved interrupted, spaced apart cutting teeth of a construction sufficient for cutting teeth in the blank parallel to the blank axis.

said generating tool having both ends supported by the second means and rotatable thereby about the tool axis at a preselected speed during cutting; and means for linearly moving said generating tool only in a direction parallel to said blank axis during cutting.

2. An apparatus as set forth in claim 1, wherein the second means also holds the axis of the generating tool parallel to a line perpendicular to the axis of the blank during cutting.

3. An apparatus as set forth in claim 1 or claim 2, including means for rotating the blank and the generating tool so that the rotational speeds are responsive to each other.

* * * * *